United States Patent [19]

Kenmochi

[11] Patent Number: 6,038,036
[45] Date of Patent: *Mar. 14, 2000

[54] COMMUNICATION SYSTEM AND APPARATUS

[75] Inventor: Toshio Kenmochi, Fujisawa, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/615,045

[22] Filed: Mar. 12, 1996

[30] Foreign Application Priority Data

Mar. 15, 1995 [JP] Japan .................................... 7-055365

[51] Int. Cl.⁷ ..................................................... H04N 1/00
[52] U.S. Cl. ............................ 358/434; 358/462; 358/451
[58] Field of Search ...................................... 358/400, 401, 358/443, 450, 453, 462, 464, 451, 434; 382/176

[56] References Cited

U.S. PATENT DOCUMENTS

| | | | |
|---|---|---|---|
| 4,654,654 | 3/1987 | Butler | 340/825.5 |
| 5,146,352 | 9/1992 | Nannichi | 358/451 |
| 5,204,950 | 4/1993 | Kawashima | 395/200 |
| 5,465,326 | 11/1995 | Sawada | 395/147 |
| 5,802,150 | 9/1998 | Beck | 379/93 |
| 5,812,870 | 9/1998 | Kikinis | 395/800.32 |
| 5,844,691 | 12/1998 | Nishiyama | 358/434 |

FOREIGN PATENT DOCUMENTS 2-81560 3/1990 Japan .............................. H04N 1/00

*Primary Examiner*—Jerome Grant, II
*Attorney, Agent, or Firm*—Fitzpatrick, Cella, Harper & Scinto

[57] ABSTRACT

A communication system is constructed by interconnecting a data terminal and a communication terminal via an interface. The communication terminal receives text data created by the data terminal, develops these data into image data and then transmits the image data. In response to a command from the data terminal, the communication terminal uses a reader to read the image of an original, thereby acquiring image data, and transmits these image data to a line. On the other hand, the order of transmission of the image data based upon the text data and the image data based upon the reading of the image of the original is set at the data terminal. On the basis of the order of transmission set, the data terminal controls the execution of transmission of the two types of data in the communication terminal.

11 Claims, 14 Drawing Sheets

FIG. 14

| TYPE | TEXT DATA |
|---|---|
| NUMBER OF PAGES | 1 |
| MODE | ○○ dpi |
| TYPE | ORIGINAL |
| NUMBER OF PAGES | 5 |
| MODE | ×× dpi / FINE MODE |
| TYPE | TEXT DATA |
| NUMBER OF PAGES | 5 |
| MODE | ○○ dpi |
| TYPE | ORIGINAL |
| NUMBER OF PAGES | 1 |
| MODE | ×△ dpi / STANDARD MODE |

COMMUNICATION SYSTEM AND APPARATUS

BACKGROUND OF THE INVENTION

This invention relates to a communication system, a communication apparatus and a method of controlling communication.

In a communication apparatus available in art, text data created by a personal computer or work station and image data read by an image reader are capable of being sent for facsimile transmission by a single communication.

An apparatus of this general type is as disclosed in the specification of Japanese Patent Application Laid-Open (KOKAI) No. 2-81560. This apparatus first encodes the text data while developing the image data and transmits the text data via a modem. Thereafter, if an original is located in the image reader, the original is read by the image reader and the apparatus encodes the image data and transmits the image data via the modem.

Thus, after all of the image data based upon the text data have been transmitted, the image data based upon the original in the image reader are transmitted. This means that the order in which the text data and the image data obtained from the original are transmitted cannot be set at will. In a case where the image data obtained from the text data and the image data obtained by reading the original are combined and transmitted in a freely set sequence, it is required that the image data be incorporated in a file of the text data and that the data be treated as a single file.

With the apparatus described above, the image data of an original are transmitted, if the original has been placed in the image reader, after all of the image data obtained by developing the text data have been transmitted. Consequently, in a case where the image data obtained from the text data and the image data obtained by reading the original are mixed and transmitted for a facsimile transmission, a problem which arises is that the image data obtained from the original cannot be inserted at a desired location in text data, such as between a first page and a second page of the text data.

Furthermore, in a case where the image data obtained from the text data and the image data obtained from the original are transmitted in a desired order in the apparatus described above, it is required that the image data first be created by a personal computer or the like and that these data be transmitted after being incorporated in the file of the text data. If there are a large quantity of image data, therefore, a memory for storing the image data must have an enormous capacity. If a large memory is not provided, it may not be possible to transmit data or a limitation may be placed upon the number of pages of image data that can be transmitted.

SUMMARY OF THE INVENTION

Accordingly, an object of the present invention is to provide a communication system, a communication apparatus and a method of controlling the same, wherein image data based upon text data and image data obtained by reading the image of an original are capable of being mixed and transmitted in a desired order.

Another object of the present invention is to set the order in which an image based upon text data and the image of an original are transmitted by mixing these in a desired order in page units, and to make it possible to transmit the image data in accordance with the order set.

Another object of the present invention is to make it possible to set text data in text-file units when setting the order of transmission of an image based upon text data and the image of an original.

A further object of the present invention is to make it possible to set mode information [resolution and transmission mode (fine or standard)] on each rank of the order of data transmission when setting the order of transmission of an image based upon text data and the image of an original.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 14 is a diagram showing an example of the content of control information which indicates order in which image data are transmitted.

DESCRIPTION OF THE PREFERRED EMBODIMENTS

Preferred embodiments of the present invention will now be described in detail in accordance with the accompanying drawings.

(First Embodiment)

Figure 1:
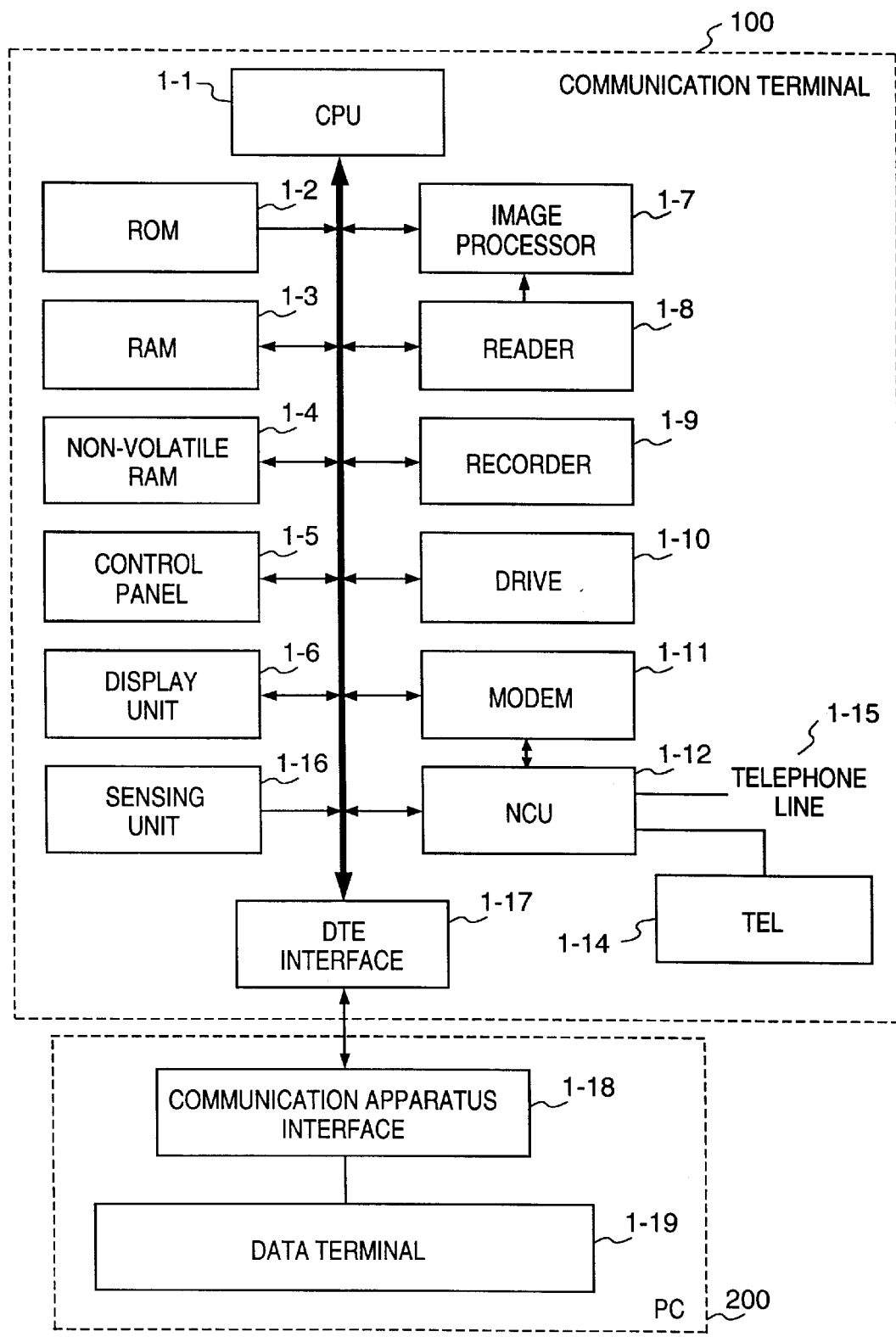
FIG. 1 is a block diagram illustrating control of a communication system according to a first embodiment of the present invention.
Figure 2:
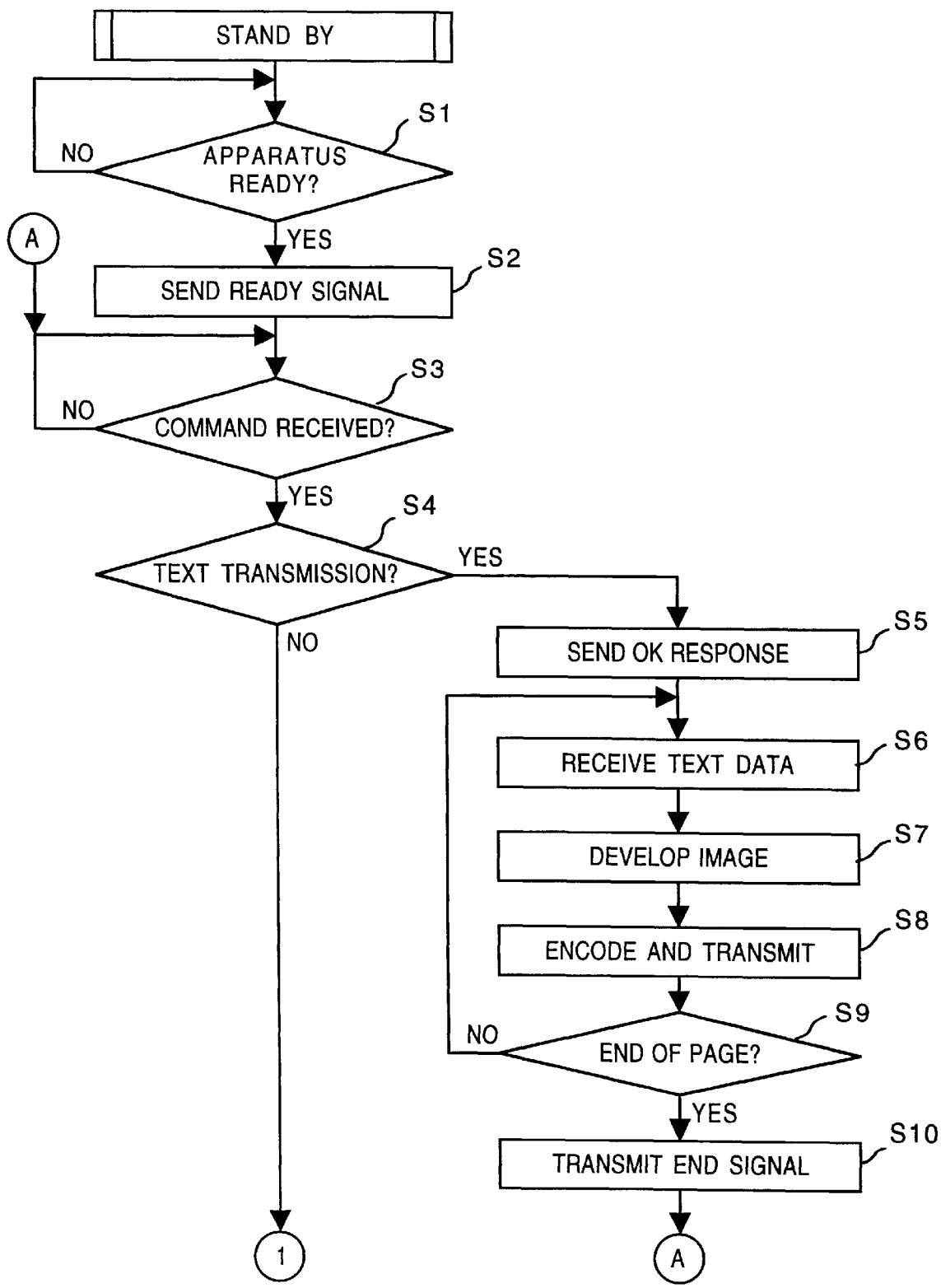
FIG. 2 is a flowchart illustrating the operation of a communication terminal according to the first embodiment.

FIG. 1 is a block diagram illustrating control of a communication system according to a first embodiment of the present invention. As shown in FIG. 1, a CPU 1-1 controls the entirety of a communication terminal 100 in accordance with a program that has been stored in the ROM 1-2. More specifically, the CPU 1-1 controls a RAM 1-3, a non-volatile RAM 1-4, a control panel 1-5, a display unit 1-6, an image processor 1-7, a reader 1-8, a recorder 1-9, a driver 1-10, a modem 1-11 and an NCU 1-12. The CPU 1-1 exchanges commands with a DTE (data terminal equipment) via a DTE interface 1-17.

Each of these blocks will now be described. The RAM 1-3 stores binary image data that have been read by the reader 1-8 or binary image data recorded by the recorder 1-9. These binary image data are modulated by the modem 1-11 and then outputted to a subscriber's line (telephone line) 1-15 via the NCU 1-12. Further, the RAM 1-3 is used to store the resulting binary data obtained by demodulating an analog waveform, which has entered from the subscriber's line 1-15 via the NCU 1-12, by modem 1-11.

The non-volatile RAM 1-4, which is an SRAM backed up by a battery, stores such data as a telephone number unique to the apparatus as well as an abbreviation of the user's name, the results of communication and an incoming-call refusal number.

The control panel 1-5 has a number of keys, specifically start keys for starting transmission and reception, mode keys for designating operating modes such as fine and standard modes for a transmitted image, a copy key used for a copying operation, a mode key by which the operator selects an operating mode based upon a command from the DTE of the communication apparatus, a stop key for stopping operation, and a transfer key for transferring an incoming signal, which has been detected by the modem and stored temporarily in the RAM 1-3, to the non-volatile RAM 1-4. The CPU 1-1 senses whether these keys have been pressed or not and controls the various components of the apparatus accordingly.

The display unit 1-6 comprises a dot-matrix-type LCD and an LCD driver and presents a variety of displays based upon the control exercised by the CPU 1-1.

The reader 1-8 comprises a DMA controller, a CCD or a contact sensor (CS), a general-purpose IC and a binarizing circuit. In accordance with control performed by the CPU 1-1, image data obtained by reading an original using the CCD or CS are sent successively to the image processor 1-7. The latter subjects the image data to image processing such as binarization and transfers the processed data to the RAM 1-3. Binary image data are thus stored in the RAM 1-3.

The recorder 1-9, which comprises a DMA controller, a thermal head or ink-jet printer head of size B4/A4 and a general-purpose IC. The recorder 1-9 extracts recording data (binary image data), which have been stored in the RAM 1-3 under control by the CPU 1-1, and prints out the recording data as a hard copy.

The driver 1-10 comprises a stepping motor for driving the paper feed and discharge rollers of the reader 1-8 and recorder 1-9, and a driver circuit for controlling the gears which transmit the driving force of the motor as well as the motor.

The modem 1-11 comprises a V.34, V.32, V.32bis, V.17, V.29, V.27ter, V.23, V.21(H,L) modem and a clock generator circuit connected to these modems. On the basis of control performed by the CPU 1-1, the modem 1-11 modulates transmission data that have been stored in the RAM 1-3 and outputs modulated transmission data to the subscriber's line 1-15 via the NCU 1-9. Furthermore, the modem 1-11 introduces the analog signal from the subscriber's line via the NCU 1-12, demodulates this signal and stores the binary image data obtained by such demodulation in the RAM 1-3.

The NCU 1-12, which comprises a DC capture circuit, an AC capture circuit, a Ci detection circuit and a two-line/four-line converter circuit, connects the subscriber's line 1-15 to the modem 1-11. A handset (telephone) 1-14 also is capable of being connected to the NCU 1-12.

The subscriber's line 1-15 is connected to the NCU 1-9. A sensing unit 1-16, which comprises a sensor for sensing the width of recording paper, a sensor for sensing whether recording paper is present or not, a sensor for sensing the width of the original and a sensor for sensing whether the original is present or not, senses the state of the original and recording paper by control exercised by the CPU 1-1. The DTE interface 1-17 is an interface which interfaces the communication terminal 100 and an information processing terminal 200.

The information processing terminal (here a well-known personal computer, referred to as a "PC") connected to the communication terminal 100 described thus far has a communication-terminal interface 1-18, which is connected to the DTE interface 1-17 via cable, and a data terminal 1-19 for executing various information processing. The interface standard of this portion of the embodiment is that of an RS-232C interface.

The operation of the first embodiment will now be described with reference to the flowcharts of FIGS. 2 through 10.

FIGS. 2 through 5 are flowcharts illustrating the operation of the communication terminal 100 according to the first embodiment. At step S1, it is determined whether the communication apparatus is capable of receiving a command from the PC 200. If the apparatus is capable of receiving the command, then the apparatus sends a READY signal to the PC 200 at step S2.

Next, the apparatus waits for the command from the PC 200 at step S3. If the command is received, the apparatus determines, at the ensuing steps S4, S11, S17, S23, S29 and S35, the type of command that has been received and performs an operation in accordance with the particular command.

Commands MPS, EOM and EOP in the description below are stipulated by communication standard T30.

The command MPS is sent to the facsimile machine of the communicating party after the transmission of one page is finished but before the next page is transmitted. In this example, the command MPS indicates that the image data of a page to be transmitted next will be sent at a resolution identical with that of the image data of the preceding page. Upon becoming capable of receiving the next page, the communicating party's facsimile machine responds to the MPS command by transmitting an MCF command.

The EOM command is sent to the facsimile machine of the communicating party after the transmission of one page is finished but before the next page is transmitted. In this example, the command MPS indicates that the image data of a page to be transmitted next will be sent at a resolution different from that of the image data of the preceding page. Accordingly data indicating the resolution to be set anew is appended to the EOM command. The communicating party's facsimile machine sends back a CFR command when preparations for receiving the image data of the next page at the new resolution have been completed.

The EOP command is sent to the other party's facsimile machine if, after the transmission of one page is finished, there is no page to be transmitted next.

If it is determined at step S4 that the command received is a text transmission command, then the program proceeds from step S4 to step S5. The apparatus sends an OK signal back to the PC 200 as a response signal at step S5. While receiving the text data from the PC 200 at step 6, the apparatus develops the received text data into image data at step S7. This is followed by step S8, at which the apparatus encodes the developed image data into an HM, MR or MMR code and sends the command to the line 1-15 as image information via the modem 1-11 and NCU 1-12. Next, at the decision step S9, the processing from steps S6 to S8 is repeated until one page of text data has been received from the PC 200, encoded in its entirety and transmitted. When the transmission of one page of text data has ended, the program proceeds from step S9 to step S10. Here the program sends an END signal back to the PC 200, after which the program returns to step S3.

If the command received at step S3 is an image transmission command, then the program proceeds from step S11 to step S12. The apparatus sends an OK signal back to the PC 200 as a response signal at step S12. Next, at step S13, an original that has been placed in the communication apparatus is read by the reader 1-8 and the read data are binarized by the image processor 1-7. The image data thus binarized are stored in the RAM 1-3. This is followed by step S14, at which the apparatus encodes the binarized image data into an HM, MR or MMR code and sends the command to the line 1-15 as image information via the modem 1-11 and NCU 1-12. Next, at step S15, it is determined whether the reading of one original and the transmission of the resulting data have been completed. If the answer is "YES", then the program proceeds to step S16, where the apparatus sends the END signal back to the PC 200, after which the program returns to step S3.

If the command received at step S3 is the MPS command, then the program proceeds from step S17 to step S18. The apparatus sends an OK signal back to the PC 200 as a response signal at step S18. Next, the apparatus sends the MPS signal to the line 1-15 at step S19 and executes a T.30 post-procedure with the communicating party's facsimile machine at step S20. Then, if the MCF signal has been received at step S21, the apparatus sends the END signal back to the PC 200 at step S22 to inform the PC 200 of the fact that the post-procedure has ended, after which the program returns to step S3 and the apparatus waits for the next command.

If the command received at step S3 is the EOM command, then the program proceeds from step S23 to step S24. The apparatus sends an OK signal back to the PC 200 as a response signal at step S24. Next, the apparatus sends the EOM signal to the line 1-15 at step S25 and executes a T.30 procedure with the communicating party's facsimile machine at step S26. The apparatus waits for reception of the CFR signal at step S27. If the signal has been received, the apparatus sends the END signal back to the PC 200 at step S28 to inform the PC 200 of the fact that the post-procedure has ended, after which the program returns to step S3 and the apparatus waits for the next command.

If the command received at step S3 is the EOP command, then the program proceeds from step S29 to step S30. The apparatus sends an OK signal back to the PC 200 as a response signal at step S30. Next, the apparatus sends the EOP signal to the line 1-15 at step S31 and executes a T.30 post-procedure with the communicating party's facsimile machine at step S32. If the post-procedure has been completed, the apparatus sends the END signal back to the PC 200 at step S33 to inform the PC 200 of the fact that the post-procedure has ended. The line 1-15 is then released at step S34 and the program returns to step S3 where the apparatus waits for the next command.

If the command received at step S3 indicates the start of transmission, then the program proceeds from step S35 to step S36. It should be noted that the transmission start command is sent from the PC 200 before anything else at the time of facsimile transmission. The apparatus sends an OK signal back to the PC 200 as a response signal at step S36 and executes a T.30 preliminary procedure for facsimile transmission at step S37. The apparatus waits for reception of the CFR signal from the communicating party at step S38 and the program proceeds to step S39 when the CFR signal has been received. The apparatus sends the END signal back to the PC 200 at step S39 to inform the PC 200 of the fact that image information is capable of being transmitted, after which the program returns to step S3 and the apparatus waits for the next command.

Operation at the time of facsimile transmission by the PC 200 connected to the communication terminal 100 will be described based upon the flowcharts of FIGS. 6, 7, 8, 9 and 10. FIGS. 6 through 10 are flowcharts illustrating operation at the time of facsimile transmission by the PC.

First, before the transmission mode is established, it is required that control information be generated by the application software in the PC 200 in a transmission setting mode. The control information indicates the order in which image data based upon the text data and image data read by the communication terminal 100 are to be transmitted to the communicating party. This transmission setting mode for generating the control information will be described in accordance with FIG. 6.

Figure 6:
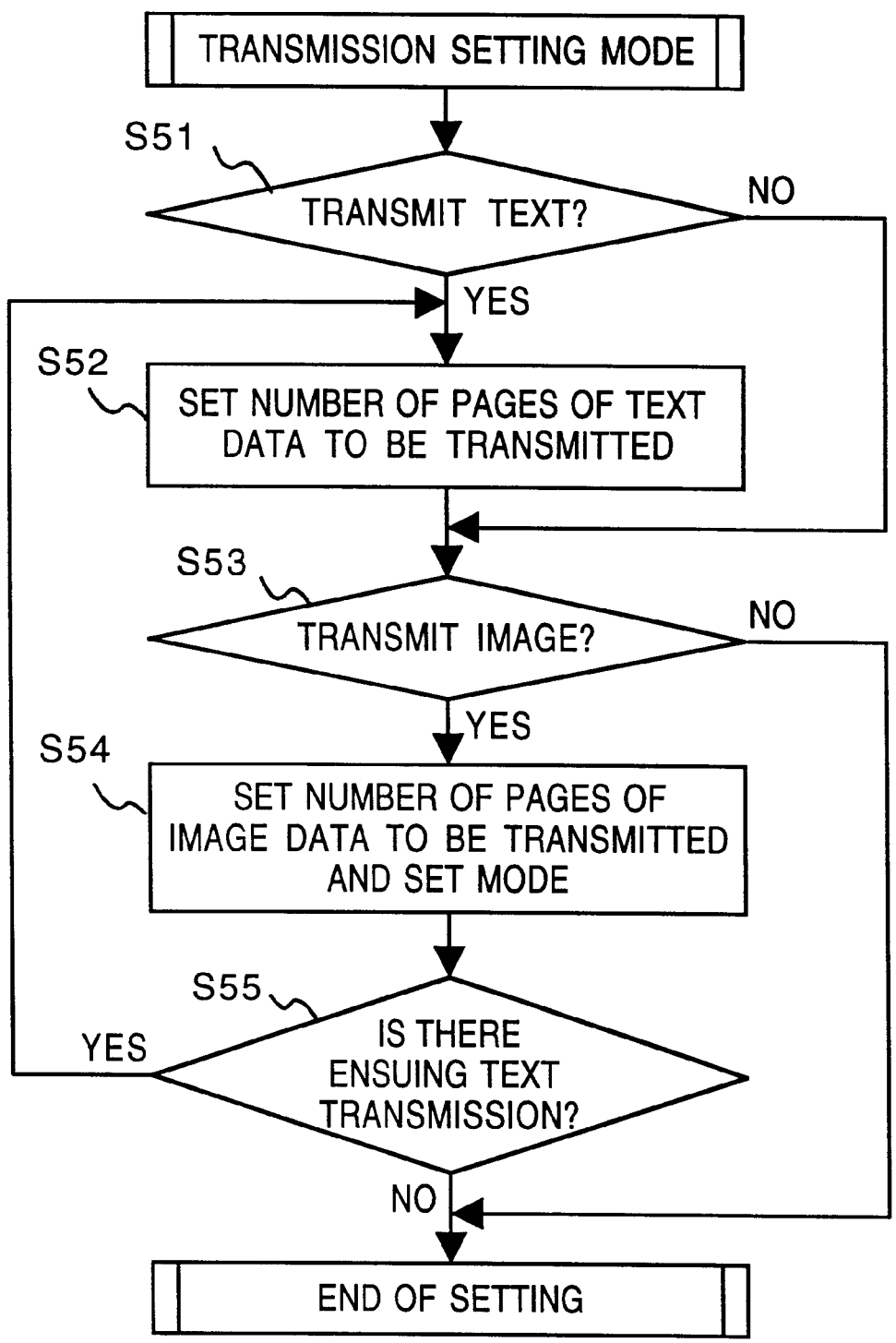
FIG. 6 is a flowchart illustrating operation at the time of a facsimile operation performed by a personal computer.
Figure 7:
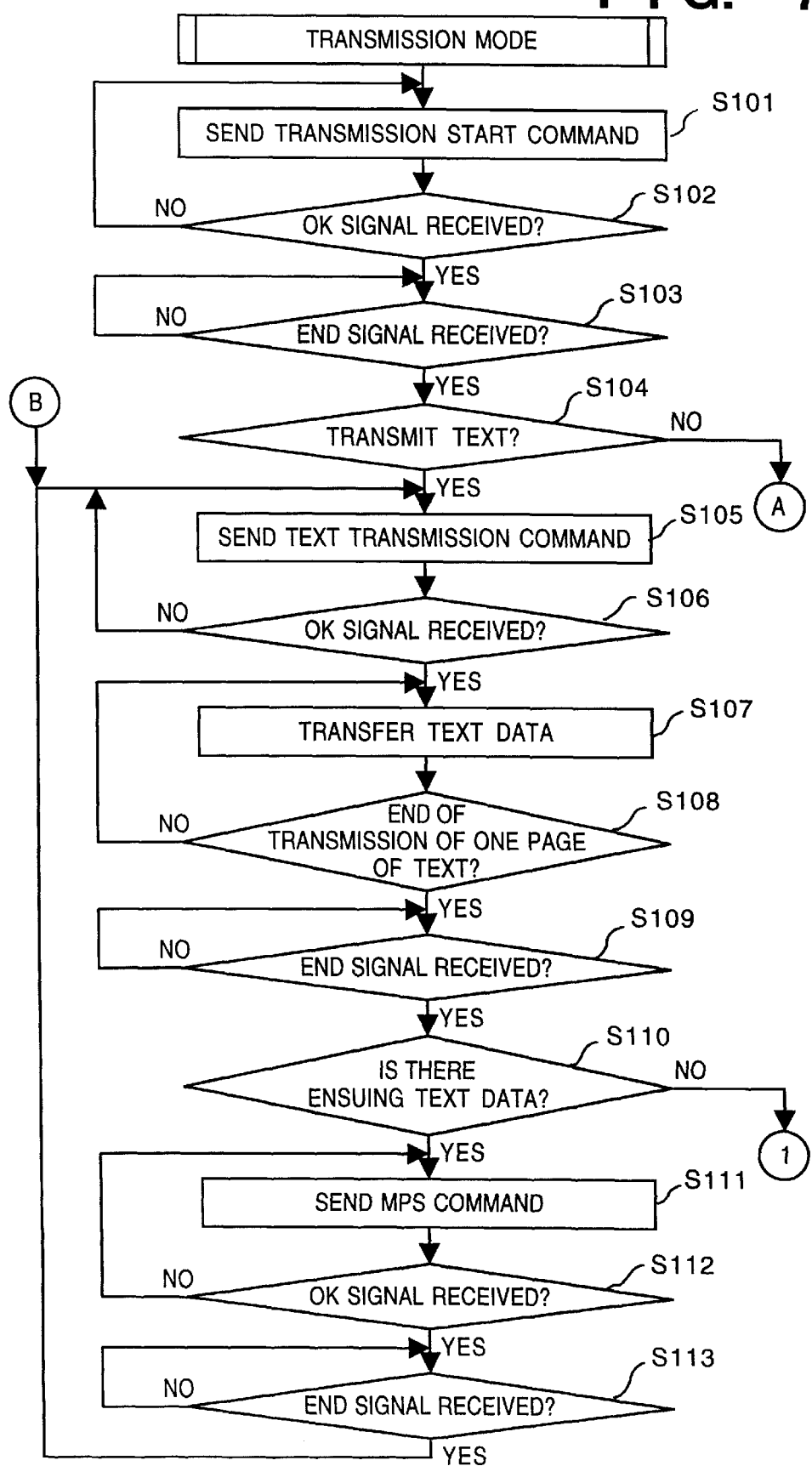
FIG. 7 is a flowchart illustrating operation at the time of a facsimile operation performed by a personal computer.
Figure 8:
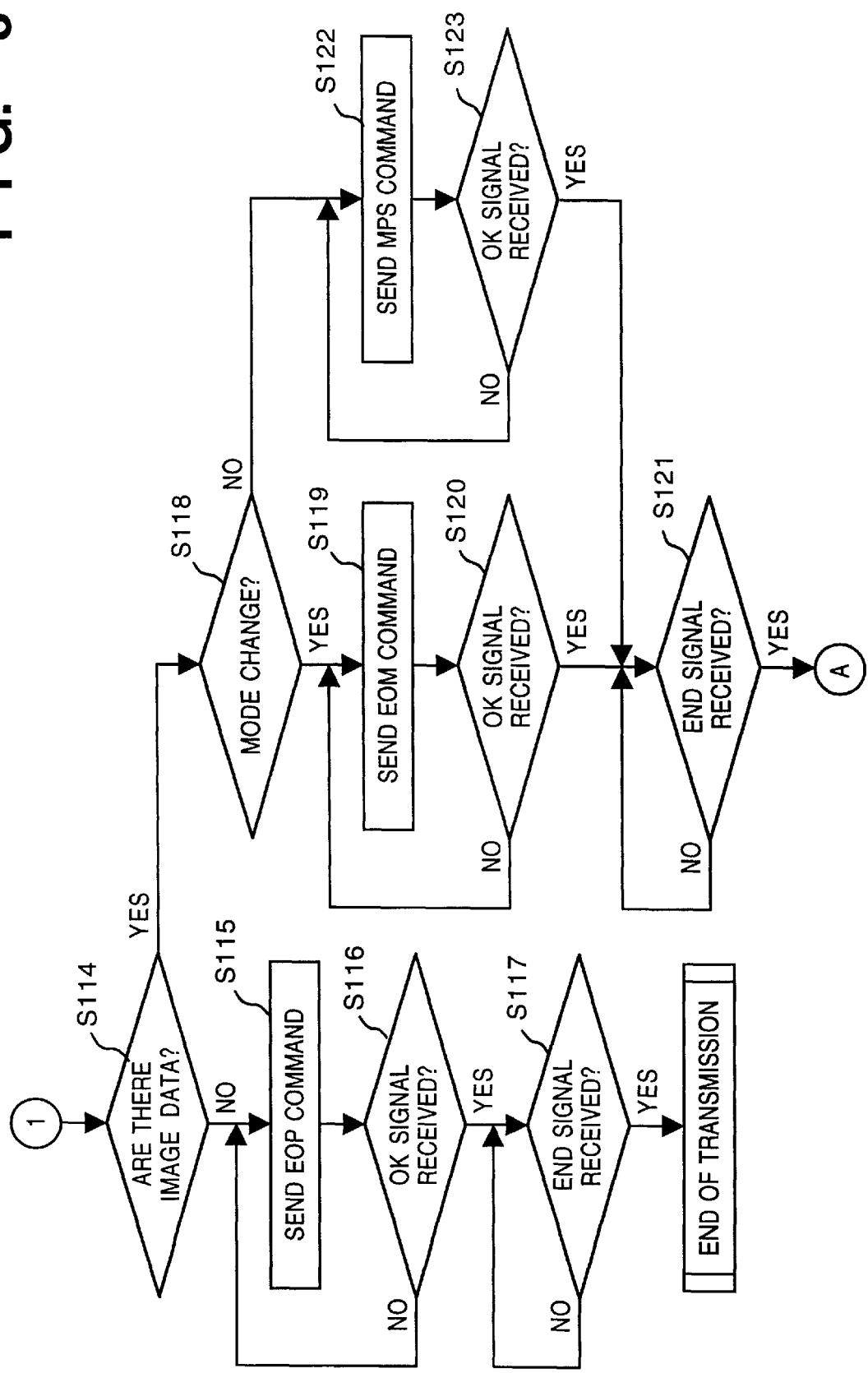
FIG. 8 is a flowchart illustrating operation at the time of a facsimile operation performed by a personal computer.

At step S51 in FIG. 6, the operator is made to enter whether text data are to be transmitted using the communication terminal 100. If transmission of text data is not required, the program proceeds from step S51 to step S53, at which a transition is made to setting of image transmission. On the other hand, if text data are transmitted by the communication terminal 100, the program proceeds from step S51 to step S52. Here the text data desired to be transmitted are selected and the number of pages to be transmitted is designated.

Next, if it is found at step S53 that an original that has been set in the communication terminal 100 is desired to be transmitted, the program proceeds to step S54 and the operator is made to enter the number of pages to be transmitted and the transmission mode (fine/standard, MR/MH, halftone/binary, etc.). If, after transmission of the original, it is determined at step S55 that further transmission of text data is required, the program returns to step S52 to again establish the mode for entry of text data. If entry is no longer necessary, then this input mode is terminated from step S53 or step S55.

This operation makes it possible for the operator to set facsimile communication in which text data and image data are mixed. For example, by using the PC 200, it is possible to make a setting according to which five pages of an original set in the communication apparatus are transmitted in the fine mode after one page of text data have been transmitted, five pages of text data created by the PC 200 are transmitted and then one page of an original set in the communication apparatus is transmitted again in the standard mode.

An example of the structure of the control information in such case is illustrated in FIG. 14. As shown in FIG. 14, the control information includes type information which indicates whether the image data to be transmitted are acquired from text data or from the image of an original, and page-number information indicating the quantity (number of pages) of data to be transmitted. The control information further includes transmission mode information, namely information indicating the distinction between the fine mode and the standard mode, and information indicating the resolution of the image data to be transmitted. These items of information are entered from the keyboard of the PC 200.

Operation of the PC 200 at the time of actual transmission will be described based upon the flowcharts of FIGS. 7, 8, 9 and 10.

When the facsimile transmission mode is implemented by the PC 200, the PC 200 sends the transmission start command to the communication terminal 100 at step S101. The PC re-sends the command at a fixed period until an OK signal is sent back from the communication terminal 100 as a response.

If the OK signal is received at step S102, then the PC 200 waits from the END signal to be sent back from the communication terminal 100 at step S103. If the END signal has been sent back, this means that the communication terminal 100 is capable of transmitting an image signal. The program therefore proceeds to step S104, at which the processing for transmitting the image signal is started.

At step S104, it is determined whether it is necessary to transmit text data by referring to the transmission information set by the above-described transmission setting mode in transfer processing. If transmission of text data is necessary, an operation for transmitting the text data is performed at step S105. If transmission of text data is unnecessary, however, the processing (image-data transmission processing) from step S114 onward is executed.

If text data are transmitted, the PC 200 sends a text transmission command to the communication terminal 100 at step S105 and re-sends the command at a fixed period until the OK command signal is sent back.

If it is found at step S106 that the OK signal has been received, the PC 200 transfers the text data to the communication terminal at step S107. One page of the text data are transferred (step S108).

After the transfer of one page of text data to the communication terminal 100 is finished, the program proceeds to step S109, at which the PC 200 waits for reception of the END signal from the communication terminal 100 indicating that the transmission of one page of text data has been completed. The program proceeds to step S110 if the END signal is received. At step S110, the PC 200 determines whether there are ensuing text data to be sent. If ensuing text data exist (i.e., if the number of pages for transmission set in the transmission setting mode have not yet been transmitted), the PC 200 sends the MPS command at step S111. The command is sent repeatedly at a fixed period until an OK signal is sent back from the communication terminal 100. If the OK signal is received at step S112, then the program proceeds to step S113 where the PC 200 waits for reception of the END signal indicating the fact that the next page of text data is capable of being transmitted. If the END signal is received, the program returns to step S105 and the operation described above is repeated.

If it is found at step S110 that there are no text data to be transmitted next (i.e., if the number of pages for transmission set in the transmission setting have been transmitted), the program proceeds to step S114. Here the PC 200 refers to the control information, which was generated in the transmission setting mode of the PC 200, to determine whether a setting has been made to transmit the original set in the communication terminal 100. If it is unnecessary to send the original, a transition is made to processing for ending transmission. Specifically, the PC 200 sends the EOP transmission command to the communication terminal 100 at step S115 and sends the command repeatedly at a fixed period until the OK signal is sent back as a response. If the OK signal is received, the PC 200 waits for the END signal at step S117. If the END signal is received, it is construed that the current facsimile communication by the communication terminal 100 has ended and, hence, the transmission mode processing is terminated.

If it is found at step S114 that control information has been set so as to transmit an original, the program proceeds to step S118. Here it is determined whether reading of the original is to be performed at a resolution different from that which prevailed at the time of transmission of the text data. If transmission is to be performed at a different resolution (the resolution has been set in the transmission setting mode), the mode is changed. Specifically, the PC 200 sends the EOM command to the communication terminal 100 at step S119 and sends this command repeatedly at a fixed period until the OK signal is sent back as a response. The program proceeds to step S121 if the OK signal is received.

If it is found at step S118 that the resolution need not be changed, the program proceeds to step S122, at which the PC 200 sends the MPS command instead of the EOM command. If the OK command is received at step S123, then the program proceeds to step S121.

The PC 200 waits at step S121 for reception of the END signal notifying the PC 200 of the fact that image information is capable of being transmitted. If the END signal is received at step S121, the program proceeds to step S124. Here the PC 200 sends the image transmission command to the communication terminal 100. This command is sent repeatedly at a fixed period until the OK signal is sent back (step S125).

If the OK signal is received at step S125, the PC 200 waits at step S126 for reception of the END signal from the communication terminal 100 indicating the fact that transmission of one page of image data has been completed. If the END signal is received, the PC 200 determines at step S127 whether transmission of ensuing image data is necessary. If ensuing image data exist (i.e., if the number of pages for transmission set in the transmission setting mode have not yet been transmitted), the PC 200 sends the MPS command at step S128. The command is sent repeatedly at a fixed period until an OK signal is sent back (step S129). If the OK signal is received, then the program proceeds to step S130 where the PC 200 waits for reception of the END signal indicating the fact that the next page of image data is capable of being transmitted. If the END signal is received, the program returns to step S124 and the operation described above is repeated.

If it is found at step S127 that there are no image data to be transmitted next, the program proceeds to step S131. Here the PC 200 refers to the control information, which was set in the transmission setting mode of the PC 200, to determine whether text data to be transmitted next exist. If it is unnecessary to send text data, the program proceeds to step S132 where a transition is made to processing for ending transmission. Specifically, the PC 200 sends the EOP command to the communication terminal 100 at step S132. This command also is sent repeatedly at a fixed period until the OK signal is sent back as a response. If the OK signal is received, the PC 200 waits for the END signal at step S134. If the END signal is received, it is construed that the current facsimile communication by the communication terminal 100 has ended and, hence, the transmission mode is terminated.

If it is found at step S131 that control information has been set so as to transmit the next text data, the program proceeds to step S135. Here it is determined whether transmission of the text data is to be performed at a resolution different from that which prevailed at the time of transmission of the image data (original). If transmission is to be performed at a different resolution, it is required that the mode be changed. To this end, the PC 200 sends the EOM command to the communication terminal 100 at step S136 and sends this command repeatedly at a fixed period until the OK signal is sent back as a response. The program proceeds to step S138 if the OK signal is received.

If it is found at step S135 that the resolution need not be changed, the program proceeds to step S139, at which the PC 200 sends the MPS command instead of the EOM command. If the OK command is received at step S140, then the program proceeds to step S138. The PC 200 waits at step S138 for reception of the END signal notifying the PC 200 of the fact that image information is capable of being transmitted. If the END signal is received at step S138, the program returns to the processing of step S105 onward and the text data are transmitted.

Thus, in accordance with the first embodiment described above, the information processing terminal (the PC 200) is provided with means for optionally setting the number of pages of text data to be transmitted, the number of pages of image data to be transmitted and the transmission mode in a case where image data and text data are mixed and transmitted by a single facsimile communication operation. It is possible to transfer the text data and image data in a desired order without accepting the image data in the PC 200.

As a result, the following advantages are obtained:

1. Text data and image data can be freely combined in page units and transmitted to the communicating party's facsimile machine by a single communication operation.

2. It is no longer necessary for the PC 200 to temporarily accept plural items of image data that are to be transmitted. This means that the PC 200 need store only one page of data at most. As a result, the mixed communication of text data and image data becomes possible without providing the PC 200 with a large-capacity memory.

3. The number of pages of image data that can be transmitted is not limited by the capacity of the memory of the PC 200.

Furthermore, using a communication terminal (facsimile terminal) which includes an image reader, as in the first embodiment, means that the PC 200 need not manage any image data as data. The mixed communication of text data and image data can be carried out without providing the PC 200 with a memory for the image data.

(Second Embodiment)

Figure 11:
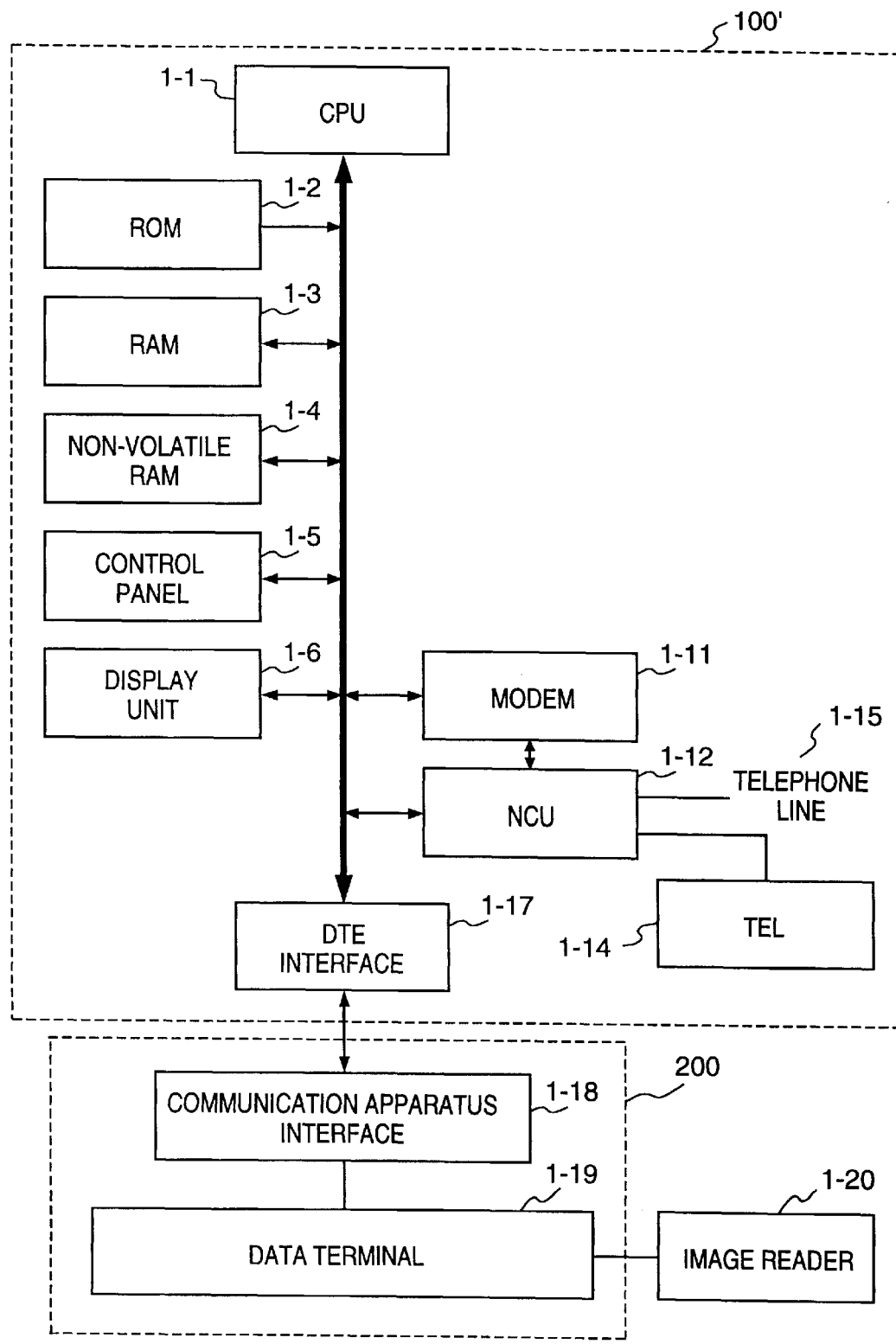
FIG. 11 is a block diagram illustrating control of a communication system according to a second embodiment of the present invention.

In the first embodiment, a facsimile terminal having an interface with a PC is adopted as the terminal connected to the PC. In the second embodiment, as shown in FIG. 11, a communication system is constructed by connecting a communication terminal 100' other than a facsimile terminal (where the terminal 100' is constituted by a modem box or modem card and does not possess an image reader) to the PC 200 to which an image reader 1-20 has been connected.

In this case, the operation of the communication terminal 100' and the operation of the PC 200 are substantially the same as in the first embodiment. The differences will be described below. The flowcharts of FIGS. 3 and 9 are modified as shown in FIGS. 12 and 13.

Figure 3:
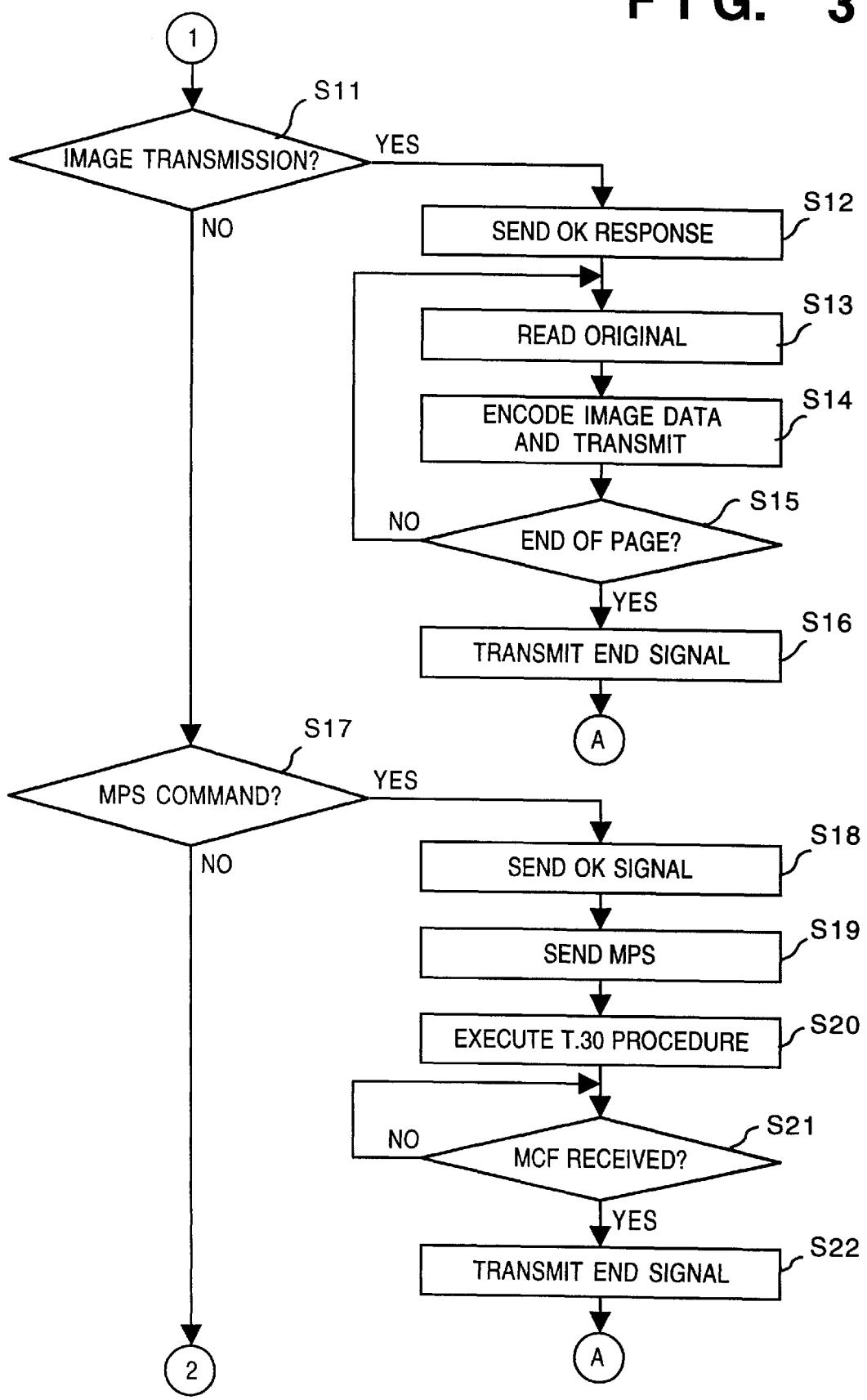
FIG. 3 is a flowchart illustrating the operation of a communication terminal according to the first embodiment.
Figure 4:
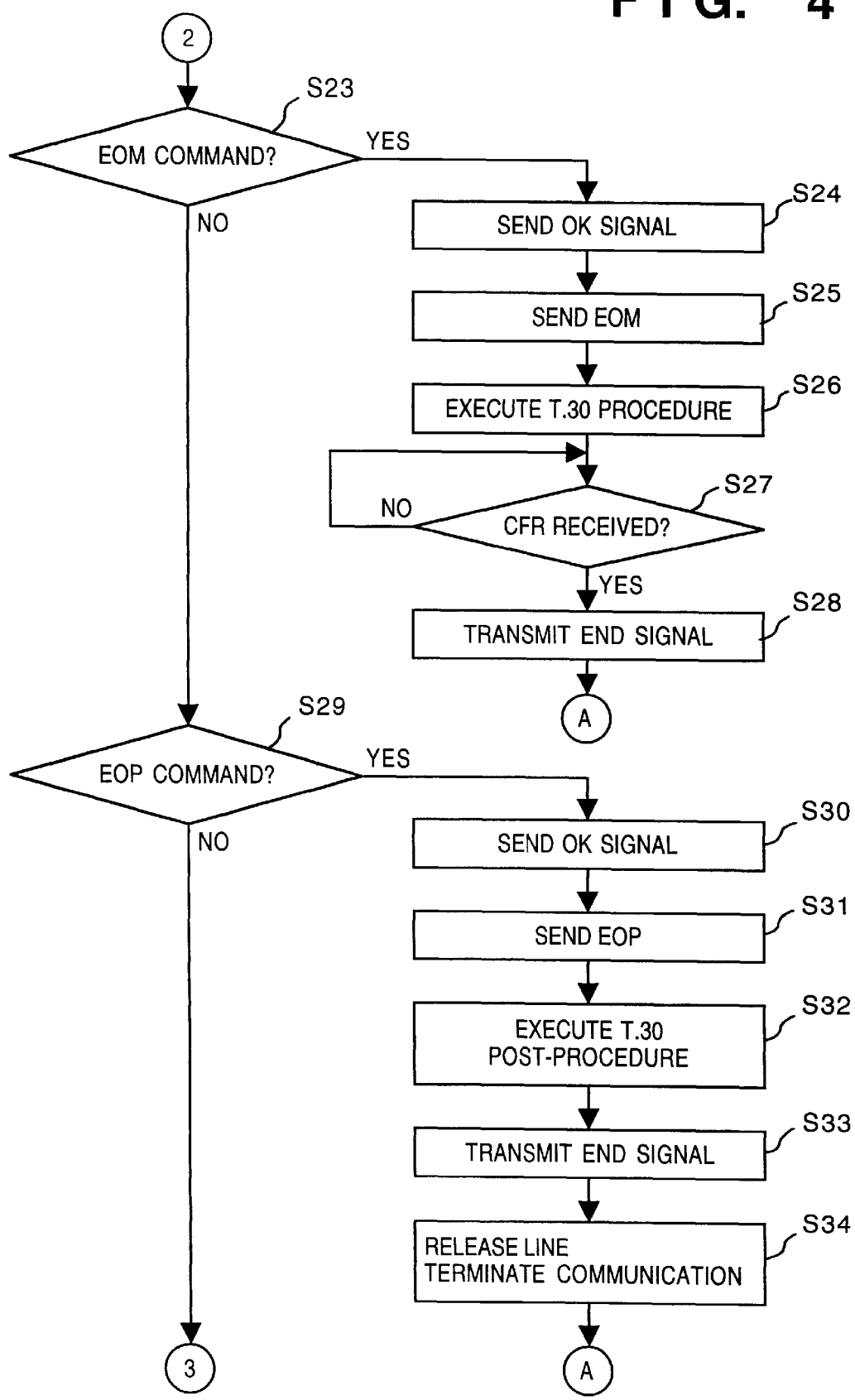
FIG. 4 is a flowchart illustrating the operation of a communication terminal according to the first embodiment.
Figure 5:
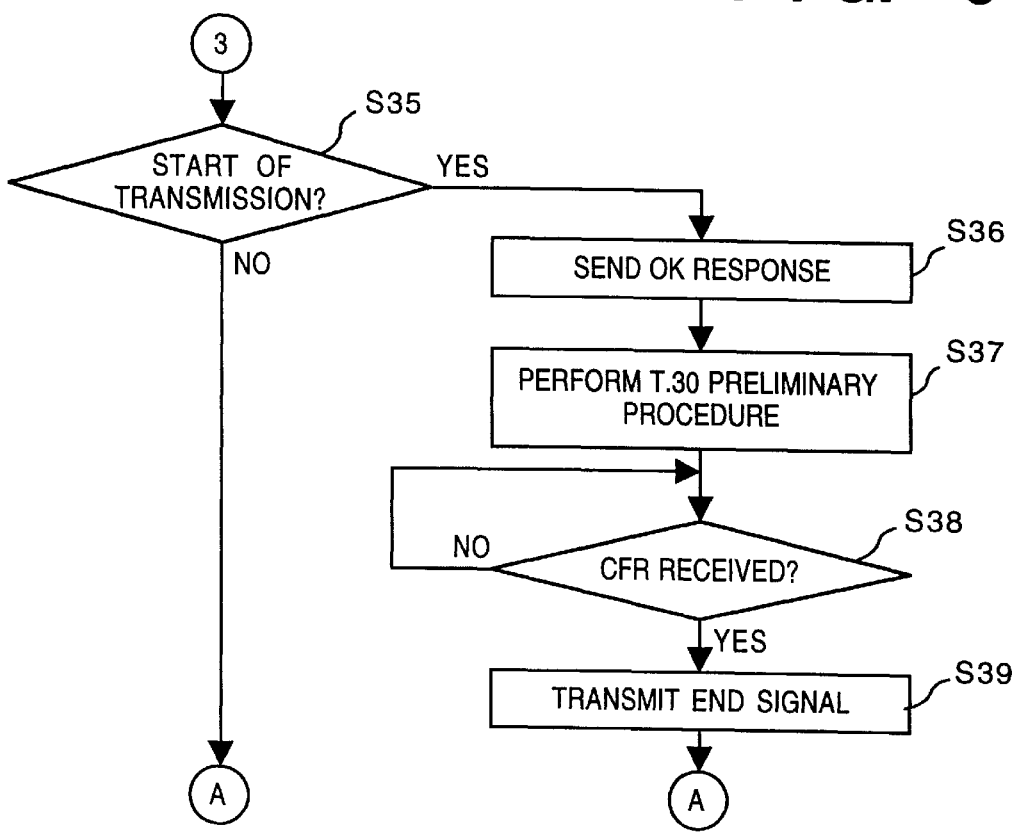
FIG. 5 is a flowchart illustrating the operation of a communication terminal according to the first embodiment.
Figure 12:
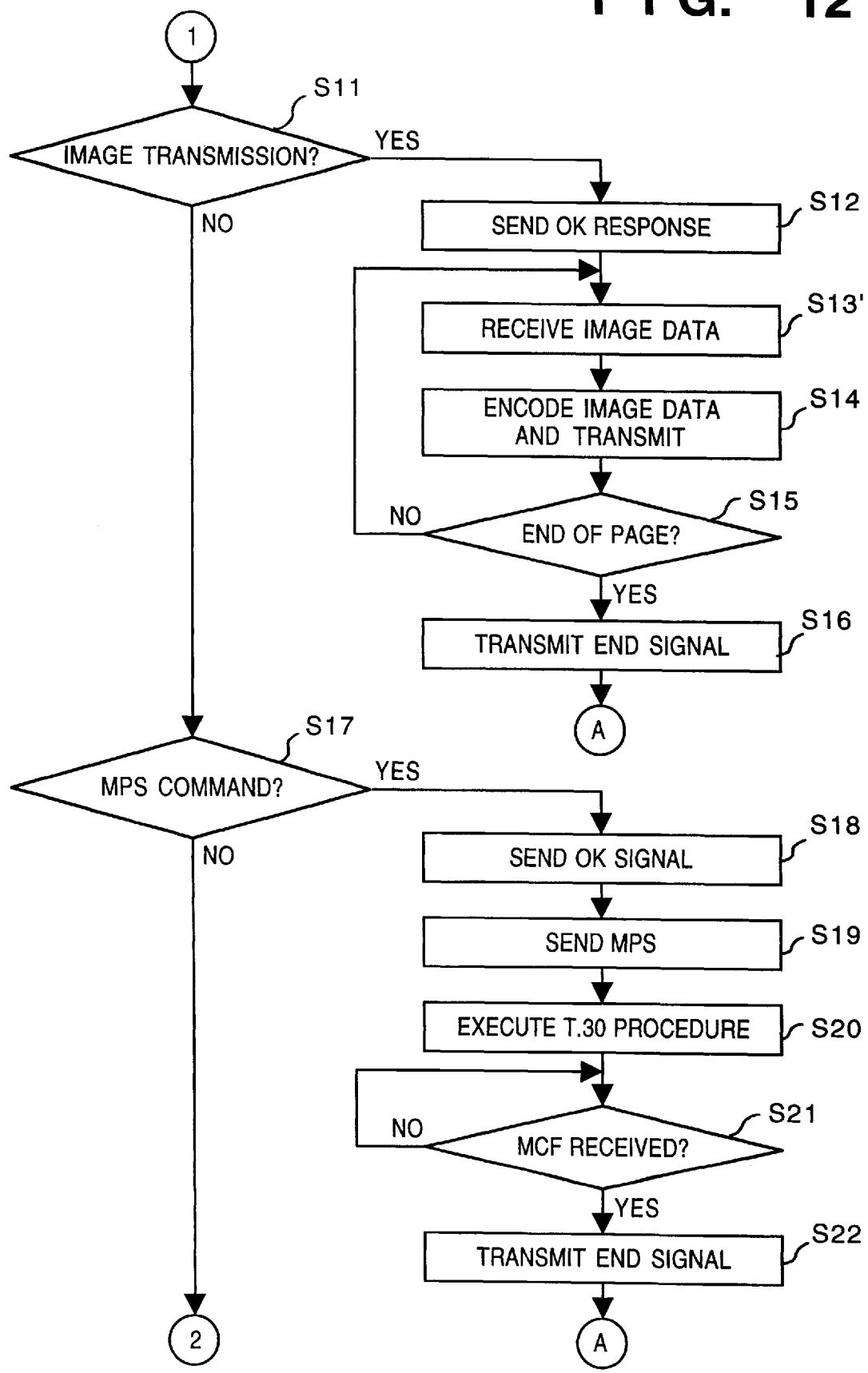
FIG. 12 is a flowchart for describing the operation of a communication terminal in the second embodiment, especially processing which corresponds to the portion of the first embodiment shown in FIG. 3.

FIG. 12 is a flowchart for describing the operation of a communication terminal in the second embodiment, especially processing which corresponds to the portion of the first embodiment shown in FIG. 3. At step S13' in FIG. 12, image data received from the PC 200 are used instead of the image data read by the communication terminal at step S13 in FIG. 3.

Figure 9:
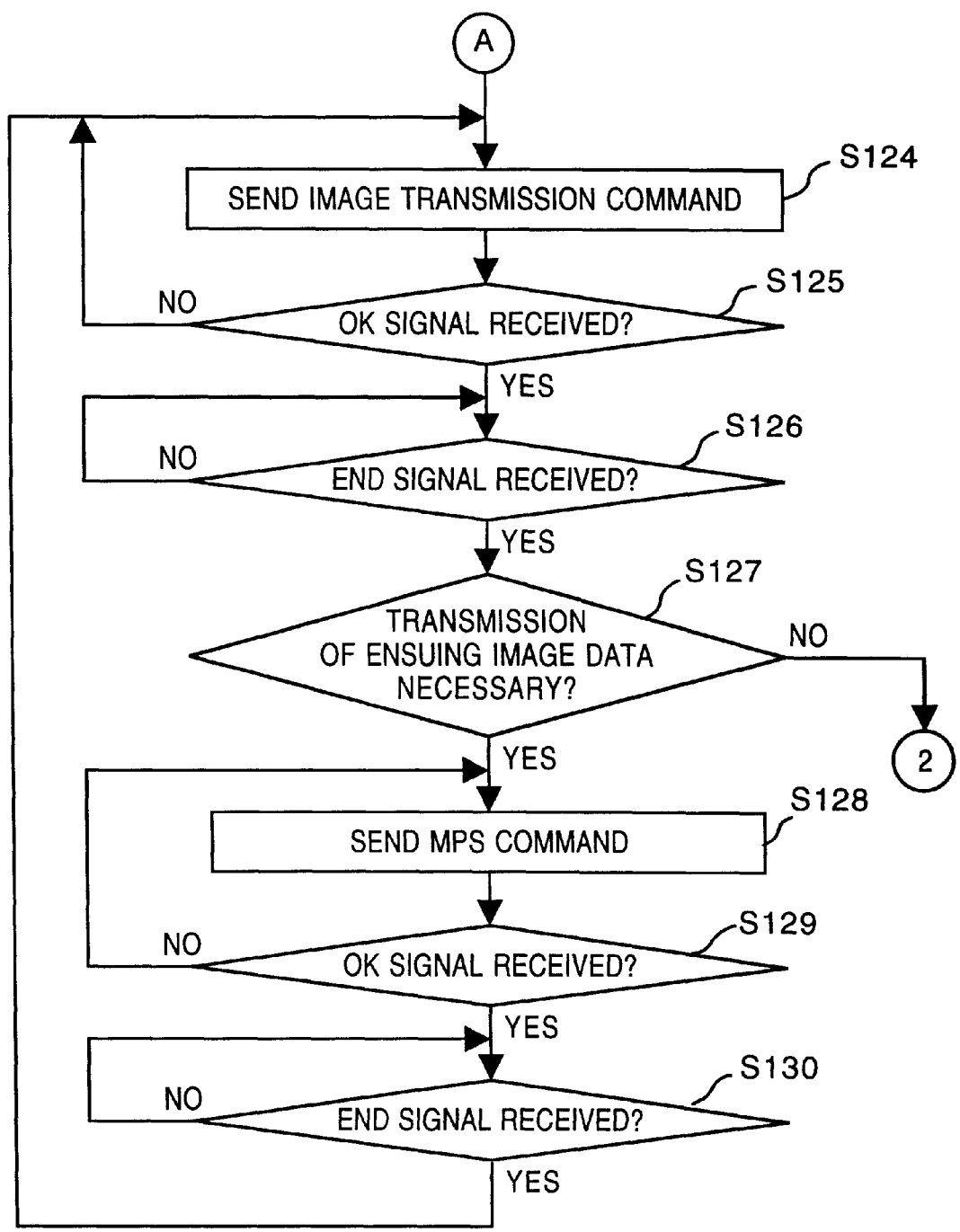
FIG. 9 is a flowchart illustrating operation at the time of a facsimile operation performed by a personal computer.
Figure 10:
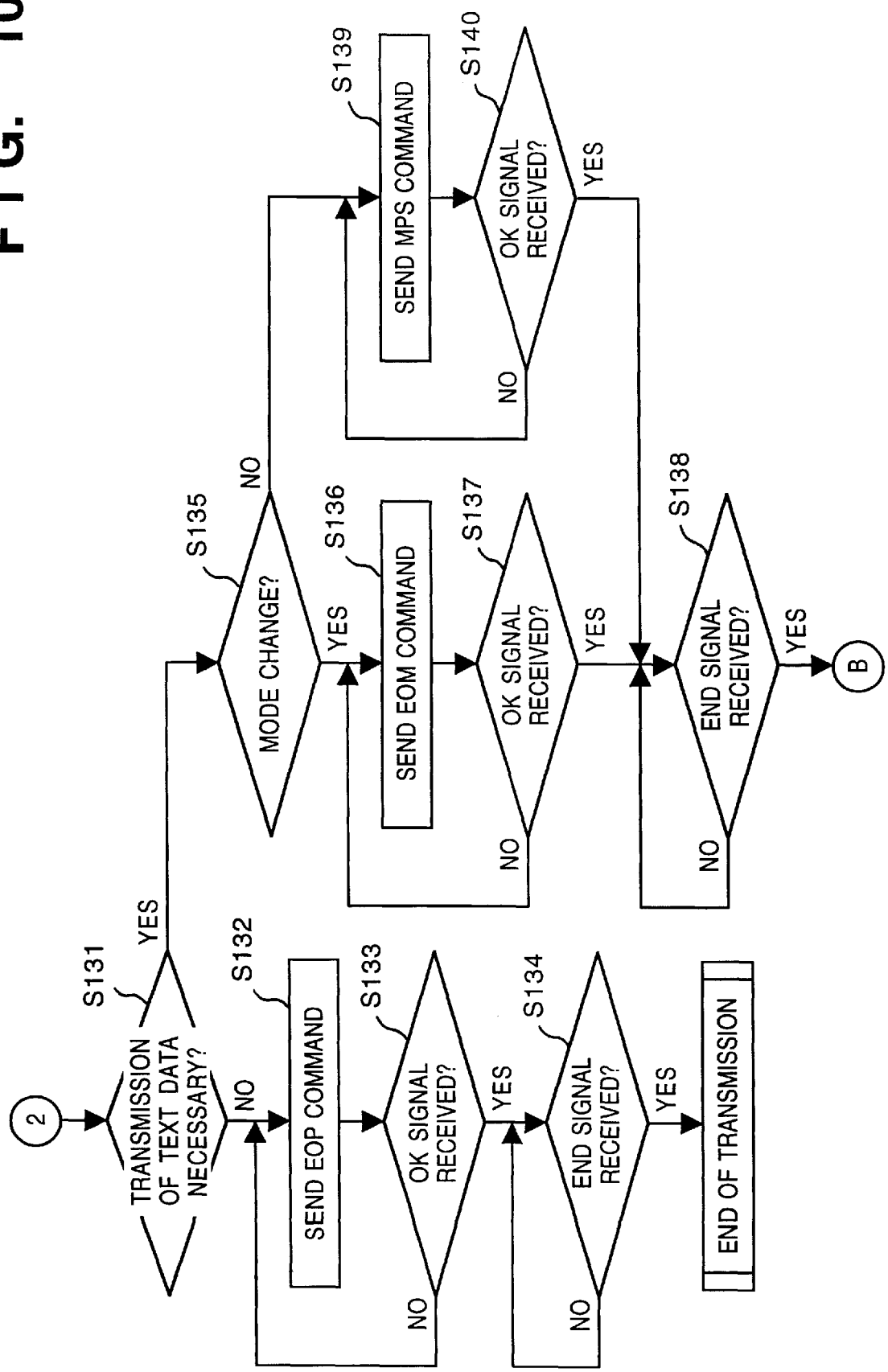
FIG. 10 is a flowchart illustrating operation at the time of a facsimile operation performed by a personal computer.
Figure 13:
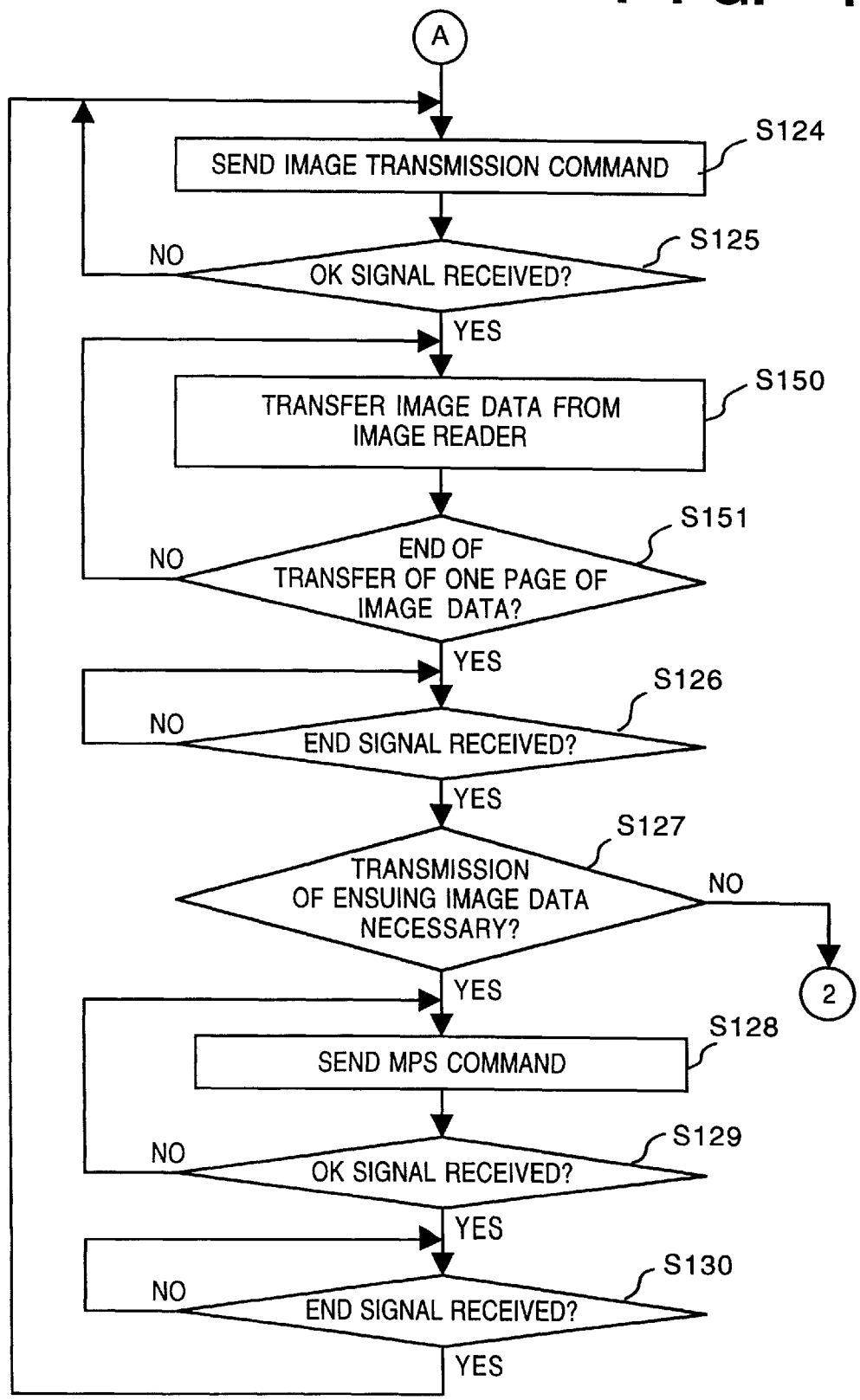
FIG. 13 is a flowchart for describing the operation of a communication terminal in the second embodiment, especially processing which corresponds to the portion of the first embodiment shown in FIG. 9.

FIG. 13 is a flowchart for describing the operation of a communication terminal in the second embodiment, especially processing which corresponds to the portion of the first embodiment shown in FIG. 9. Here steps S150 and S151 are inserted between steps S125 and S126 in FIG. 9. More specifically, when an image is transmitted, the PC 200 sends an image transmission command. When the OK signal is received, the PC 200 reads the original at step S150 by using the image reader 1-20. Then, at step S151, the PC 200 transfers one page of the image data obtained at step S150 to the communication terminal 100'.

Thus, in accordance with the second embodiment as described above, it is possible to transmit text data and image data in a desired order. In addition, a communication terminal can be used as a facsimile apparatus.

In the embodiments described above, the order of data transmission is set in units of the number of pages. However, an arrangement may be adopted in which the order is set in the units in which text data are stored, namely in file units.

Further, in the foregoing embodiments, control information is set in such an order that the image of an original and text data appear in alternating fashion. However, this does not impose a limitation upon the invention. For example, a setting can be made in such a manner that two pages of an original image are transmitted in the standard mode followed by three pages of the original in the fine mode. In such case it will suffice to modify the flowchart of FIG. 13 in such a manner that step S127 branches to step S118 if it is determined at step S127 that there are ensuing image data to be transmitted.

Thus, in accordance with the present invention as described above, image data from an image reader and image data based upon text data can be transmitted for facsimile in a desired order.

(Other Embodiment)

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A data communication apparatus comprising:
   transmitting means for transmitting data;
   first input means for inputting data to be transmitted by said transmitting means;
   second input means for inputting data to be transmitted by said transmitting means and control information, the control information indicating a transmission order of data to be transmitted by said transmitting means in page units; and
   control means for controlling said transmitting means such that the data input by said first and second input means are switched in accordance with the transmission order indicated by the control information in a single communication operation.

2. The apparatus according to claim 1, wherein said control means changes a transmission mode in accordance with the control information.

3. The apparatus according to claim 1, wherein said second input means inputs data to be transmitted as data based upon text code.

4. The apparatus according to claim 1, wherein said first input means inputs data obtained by reading an original by a reader.

5. The apparatus according to claim 4, wherein said second input means inputs the control information in a form of an instruction indicating a start of reading an original to the reader, and said first input means inputs image data of the original read by the reader in response to the instruction.

6. A data communication method comprising:
   a transmitting step of transmitting data;
   a first input step of inputting data to be transmitted in said transmitting step from a first input source;
   a second input step of inputting data to be transmitted in said transmitting step from a second input source;
   a third input step of inputting control information from the second input source, the control information indicating a transmission order of data to be transmitted in said transmitting step in page units; and
   a control step of controlling said transmitting step such that the data input in said first and second input steps are switched in accordance with the transmission order indicated by the control information in a single communication operation.

7. An information processing method of an information processing terminal in a communication system comprising a data communication terminal and the information processing terminal, comprising:
   an output step of outputting data to be transmitted by the data communication terminal, from the information processing terminal to the data communication terminal, via a communication line connecting the data communication terminal and the information processing terminal;
   a reading instruction step of instructing a reader to read an original;
   a designating step of designating a transmission order of data output in said output step and data obtained by reading the original in said reading instruction step, in a predetermined unit; and
   a transmission instruction step of outputting control information to the data communication terminal via the communication line, the control information instructing the data communication terminal to transmit data output in said output step and data obtained by reading the original in said reading instruction step based on the transmission order designated in said designating step in a single communication.

8. The method according to claim 7, wherein said reading instruction step causes a reader in the data communication terminal to read the original.

9. The method according to claim 7, wherein the reading instruction step causes a reader connected to the information processing terminal to read the original.

10. A computer readable program, stored in a storage medium, for causing a programmable apparatus to perform a data communication method, said method comprising:
    a transmitting step of transmitting data;
    a first input step of inputting data to be transmitted in said transmitting step from a first input source;
    a second input step of inputting data to be transmitted in said transmitting step from a second input source;
    a third input step of inputting control information from the second input source, the control information indicating a transmission order of data to be transmitted in said transmitting step in page units; and
    a control step of controlling said transmitting step such that the data input in said first and second input steps are switched in accordance with the transmission order indicated by the control information in a single communication operation.

11. A computer readable program, stored in a storage medium, for controlling an information processing terminal of a system comprising a data communication terminal and the information processing terminal to perform an information processing method, said method comprising:
    an output step of outputting data to be transmitted by the data communication terminal, from the information processing terminal to the data communication terminal, via a communication line connecting the data communication terminal and the information processing terminal;
    a reading instruction step of instructing a reader to read an original;
    a designating step of designating a transmission order of data output in said output step and data obtained by reading the original in said reading instruction step, in a predetermined unit;
    and a transmission instruction step of outputting control information to the data communication terminal via the communication line, the control information instructing the data communication terminal to transmit data output in said output step and data obtained by reading the original in said reading instruction step based on the transmission order designated in said designating step in a single communication operation.

* * * * *